United States Patent
Stacey et al.

(10) Patent No.: US 8,385,155 B2
(45) Date of Patent: Feb. 26, 2013

(54) DIGITAL HYDROPHONE

(75) Inventors: Newell D. Stacey, Draper, UT (US);
Gordon Cook, Midvale, UT (US);
Benjamin A. Hillery, Eagle Mountain, UT (US); Glenn Courtright, West Jordan, UT (US); Robin Padden, West Jordan, UT (US)

(73) Assignee: Exelis Inc., McLean, VA (US)

( * ) Notice: Subject to any disclaimer, the term of this patent is extended or adjusted under 35 U.S.C. 154(b) by 328 days.

(21) Appl. No.: 12/718,671

(22) Filed: Mar. 5, 2010

(65) Prior Publication Data
US 2011/0216626 A1    Sep. 8, 2011

(51) Int. Cl.
*H04B 11/00*    (2006.01)

(52) U.S. Cl. ........................................ 367/157
(58) Field of Classification Search ............... 367/157
See application file for complete search history.

(56) References Cited

U.S. PATENT DOCUMENTS

| | | | |
|---|---|---|---|
| 4,819,216 A | 4/1989 | Fraioli | |
| 5,168,473 A | 12/1992 | Parra | |
| 5,200,930 A | 4/1993 | Rouquette | |
| 5,469,403 A | 11/1995 | Young et al. | |
| 5,991,026 A * | 11/1999 | Kluth et al. | 250/227.27 |
| 6,147,930 A | 11/2000 | Moretti et al. | |
| 6,233,202 B1 * | 5/2001 | McDonald et al. | 367/5 |
| 6,594,198 B2 | 7/2003 | Amaral et al. | |
| 7,035,166 B2 | 4/2006 | Zimmerman et al. | |
| 7,176,589 B2 | 2/2007 | Rouquette | |
| 7,177,232 B1 | 2/2007 | Hagerty | |
| 2011/0110197 A1 * | 5/2011 | Brown | 367/155 |
| 2011/0216626 A1 * | 9/2011 | Stacey et al. | 367/131 |

OTHER PUBLICATIONS http://www.marsensing.com/en/Products/#, MarSensing digital hydrophone, 2008 1 page.
http://www.smidtechnology.it/upoand/allegati3758.pdf (high frequency digital hydrophone) 2 pages.
http://www.smidtechnology.it/upoand/allegati6991.pdf (general purpose digital hydrophone) 2 pages.
http://www.arstech.de.index.php?section=active_tow_sonar Arstech applied radar and sonar technlogies GmbH, applied radar & sonar technologies, 4 pages.
Staal, Modular Digital Hydrophone Array, Defences Research Establishment , 1981, Canada, pp. 518-521.

* cited by examiner

*Primary Examiner* — Daniel Pihulic
(74) *Attorney, Agent, or Firm* — Thorpe North & Western LLP

(57) ABSTRACT

A digital underwater acoustic sensor system is disclosed. The system can include an acoustic sensor configured to detect an underwater acoustic signal and form an analog signal proportional to the underwater acoustic signal. The acoustic sensor can include an interior cavity. A digital communication module can be positioned within the interior cavity. The digital communication module comprises an amplifier configured to amplify the analog signal. An analog to digital converter is configured to convert the analog signal to a digital signal. A digital signal transmission module is configured to communicate the digital signal to a receiver.

18 Claims, 4 Drawing Sheets

DIGITAL HYDROPHONE

BACKGROUND

Advancements in underwater acoustical detection technology have been comparatively slow relative to advancements in communications. One reason for this is the harsh environment in which acoustical detection takes place. Most acoustical detection devices are used in seawater, which can be substantially corrosive to electronics and cabling. In addition, towed arrays of acoustical detectors can degrade due to the forces imposed on the devices and their connecting cables as they are moved through viscous fluid. When acoustical detectors are used in deep ocean environments, the intrinsic pressures present in the ocean depths can require the need for specialized electronics designed to operate under the extreme pressures and relatively cold temperatures present in the ocean.

One result of the relatively slow technological advancement in acoustical detection technology is that acoustical detection systems typically have the same setup that has been used for decades. A typical setup involves an array of acoustical detectors connected through a series of cables to a ship or submarine. Each acoustical detector is typically connected, via a cable, to an electronics package located a set distance from the detector. The length of the cable between the detector and the electronics package can degrade the signal received by the acoustical detector, thereby increasing the noise in the signal and reducing the overall value of the information contained in the detected acoustic signal.

In addition, a relatively large number of wires is typically used to connect the multiple acoustical detectors to a receiver. Separate wires are often used to provide power, communicate outgoing signals, and incoming signals. The electronics package may also include 2 or more wires to connect with the acoustical detector. The large number of wires can be expensive and heavy, making an array of detectors difficult to deploy. Moreover, a relatively large through hole, referred to as a hull penetrator, may be needed to feed the large number of wires through a ship or submarine, thereby increasing costs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
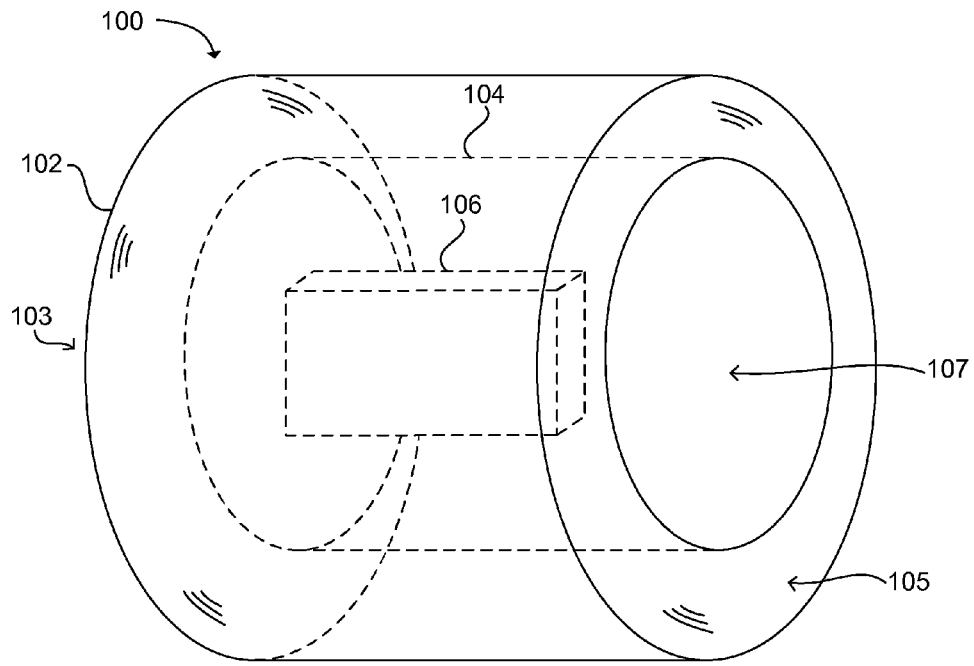
FIG. 1a illustrates an example embodiment of a digital underwater acoustic sensor system containing a digital communication module in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the terms "wire" and "cable" are used synonymously unless otherwise noted.

As used herein, the term "acoustical signal" is a sound wave propagating through a liquid or solid medium.

EXAMPLE EMBODIMENTS

An initial overview of technology embodiments is provided below and then technology embodiments are described in further detail later. This initial summary is intended to aid readers in understanding the technology more quickly but is not intended to identify key features or essential features of the technology nor is it intended to limit the scope of the claimed subject matter.

As previously discussed, a typical setup of an array of acoustical detectors comprises the acoustical detectors connected through a series of cables to a ship, a submarine, a land based location. Each acoustical detector is typically connected via a cable to an electronics package located a set distance from the detector. The electronics package is used to transmit the analog signal received by the acoustical detector to a receiver that is typically located on the vessel, or land based location. The length of the cable between the detector and the electronics package can degrade the analog signal received by the acoustical detector due to the capacitance of the cable. This increases the noise in the signal and reduces the overall value of the information contained in the detected acoustic signal.

To reduce the noise that is inserted between the acoustic signal detector and the electronics package, the length of the cable can be substantially reduced. In one embodiment, the electronics package can be placed inside of the acoustic signal detector. Placing the electronics package within the acoustic signal detector can substantially reduce the amount of noise. A conductive cable has an intrinsic amount of capacitance that is dependent on the length of the cable. For example, a cable designed for use in an underwater environment can have a capacitance of approximately 30 picoFarads (pF) per foot. Minimizing the length of this cable can provide significant improvements to the Signal to Noise Ratio (SNR) of the detected analog signal.

The acoustic signal detector can be shaped to allow the electronics package to be located substantially within the detector. The electronics package within the acoustic signal detector can then be protected against water and pressure damage. The analog signal formed by each acoustic detector can be digitized by the electronics package. Digitizing the analog signal can increase the amount of signals sent on a single wire, thereby reducing the number of wires needed in an array of acoustical detectors. Digitizing the signal can also reduce the amount of noise and interference that would otherwise be added to the analog signal as it travels along a cable to the receiver.

In accordance with one embodiment of the present invention, a digital acoustic sensor system is disclosed. One example embodiment of a digital acoustic sensor system 100 is illustrated in FIG. 1a. The system comprises an acoustic sensor 102 that is configured to detect an underwater acoustic signal and form an analog signal that is proportional to the underwater acoustic signal. Several different types of acoustic sensors may be used to detect the underwater acoustic signal. For example, a hydrophone can be used to convert the underwater acoustic signal to an analog voltage signal. In one embodiment, a piezoelectric type of hydrophone may be used to convert an acoustic pressure signal to an analog voltage. In another embodiment, the acoustic sensor can be an accelerometer configured to sense a change in velocity caused by an underwater acoustic signal. An acoustic vector sensor, such as a hydrophone vector sensor, can be used to measure the direction of the acoustic signal. Other types of acoustic sensors may be used as well. Any type of underwater acoustic sensor configured to detect a change in pressure caused by an underwater acoustic signal can be used.

In addition, the underwater acoustic sensor system 100 can be used to measure acoustic signals in solid materials as well. For example, acoustic signals traveling through the body of a vessel, such as a ship or submarine, can be measured using the acoustic sensor 102. Acoustic signals in the floor of a lake or ocean can also be measured using the acoustic sensor. Thus, the acoustic sensor can be used to measure underwater acoustic signals as they travel through liquid and solid mediums that are underwater.

The acoustic sensor 102 can have a predetermined size and shape. The size and shape are typically determined based on the intended use of the acoustic sensor. For example, the acoustic sensor may be used in a relatively low pressure environment while connected to a ship or in a relatively high pressure environment connected to a deep sea submarine or located in a deep sea environment. The size and shape of the acoustic sensor may also be selected based on the type of acoustic signal that is desired to be detected. The expected frequency and amplitude of the signal can be used to design the acoustic sensor, as can be appreciated by one of skill in the art.

The size of the acoustic sensor can vary significantly. A relatively small acoustic sensor may measure 1 cm by 1 cm in the two most significant dimensions. A relatively large acoustic sensor may measure 20 cm by 20 cm in the two most significant dimensions. Sensors smaller than and larger than these ranges are also considered to be within the bounds of the present invention. FIG. 1a shows a cylindrically shaped acoustic sensor. However, the acoustic sensor may be conical, spherical, cubic, or any other shape desired to maximize detection of an acoustic signal.

The acoustic sensor 102 can have an interior cavity 104. The size and shape of the interior cavity can also be selected based on the design and use criteria for the acoustic sensor, as discussed above. The interior cavity can be configured to have a size sufficient to position a digital communication module 106 within the interior cavity 104, as illustrated in FIG. 1.

In one embodiment, the acoustic sensor 102 can have a first face 103 having a solid surface. The solid surface may be used in the detection of underwater acoustic signals, such as in the case where the acoustic sensor is a hydrophone constructed of piezoelectric material. A second face 105 can include an opening 107 to the interior cavity 104. The opening can be used to insert the digital communication module 106 into the interior cavity. The digital communication module can be electrically connected to the acoustic sensor. For example, in one embodiment the digital communication module is electrically connected to the acoustic sensor using electrical wires. The electrical wires are typically shorter than the length of the acoustic sensor.

The interior cavity 104 of the acoustic sensor 102 may be filled or sealed to protect the electronics in the digital communication module 106. For example, a potting material may be used to substantially fill the area in the interior cavity around the digital communications module and provide waterproofing for the digital communication module. In addition, a cover may be added over the opening 107 to substantially seal the interior cavity from the outside environment.

The use of a cover can also shield the digital communication module 106 from water pressure. Prior to sealing, the interior cavity can be filled with air to provide buoyancy to the acoustic sensor 102. Alternatively, the interior cavity 104 may be filled with another material, such as a non-conductive material like non-ionic water, a mineral oil, or the like. Filling the interior cavity with a fluid can provide increased pressure resistance to the acoustic sensor 102. Acoustic performance is also considered when determining the use of a filler in the interior cavity. In another embodiment, the air can be removed from the interior cavity to form a vacuum that will enable the acoustic sensor to be more buoyant. The lid can then be used to substantially seal the digital communication module within the acoustic sensor. An electronic lead from the digital communication module can be fed through the lid, through the sensor, or between the lid and the sensor to enable the signal from the digital communications module to be transmitted.

Figure 1B:
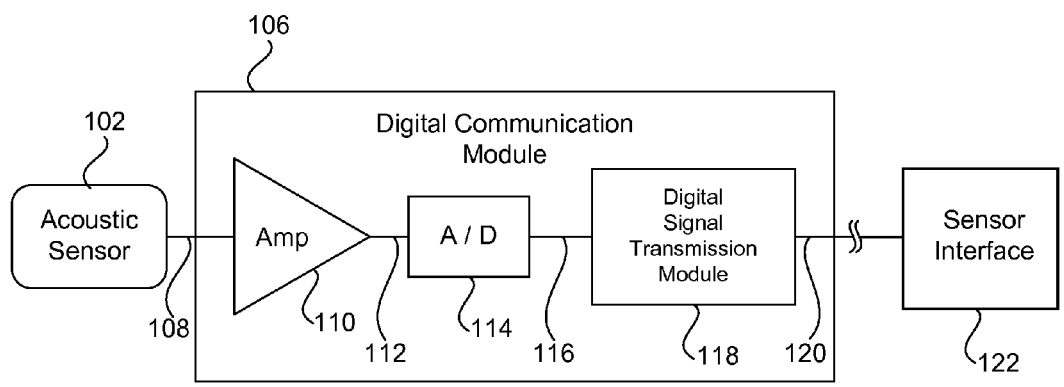
FIG. 1b illustrates an example embodiment of a digital communication module in accordance with an embodiment of the present invention.

A block diagram of the digital communication module 106 is shown in FIG. 1b. The digital communication module includes an amplifier 110 configured to amplify the analog signal 108 output by the acoustic sensor 102. The amplifier can be a low-power type amplifier commonly referred to as a preamplifier. A low-noise type of amplifier is also typically used. The amplified analog signal 112 is then sent through an analog to digital (A/D) converter 114 and converted to a digital signal 116. The level of resolution of the A/D converter is dependent on the system specifications and the amplitude of the acoustic signals that are detected. The digital signal is then sent to a digital signal transmission module 118.

The digital signal transmission module 118 is configured to communicate the digital signal output by the A/D converter 114 to a sensor interface 122. The sensor interface is typically positioned a predetermined distance from the acoustic sensor, and is often located on a ship, submarine, or land based location where the signals from the acoustic sensor(s) can be analyzed. Thus, the digital signal may need to be transmitted along hundreds of feet of cable before reaching the sensor interface. Where the receiver is land-based, the signal may be transmitted hundreds of miles. In this case, repeaters may be used to amplify the signal at selected intervals, as can be appreciated.

The digital signal transmission module 118 can take advantage of the digital format of the signal 116 and use a digital modulation scheme to transmit the signal to the sensor interface. For example, quadrature amplitude modulation or shift keying based on phase, frequency, or amplitude may be used to modulate the digital signal 116 onto an analog carrier signal to form a digital modulation signal 120. Other types of modulation schemes may also be used to form the digital modulation signal, as can be appreciated. In addition, the digital signal 114 can be subdivided and carried on multiple channels. Alternatively, multiple digital modulation signals 120 output from a plurality of acoustic sensors 102 can be combined using multiplexing and transmitted to the sensor interface 122. This will be discussed more fully below.

The digital signal transmission module 118 may also include a receiver (or transceiver) operable to receive signals from the sensor interface 122 or another signal source in an acoustic array. This enables bi-directional communication. Bi-directional communication can be used to change the setup of the digital communication module 106. For example, the level of amplification of the analog signal 108 may be changed depending on the type of acoustic signal 108 being detected. The A/D converter 114 may include multiple analog to digital converters with different levels of precision. For example, an 8 bit A/D converter may be sufficient for the detection of relatively high power acoustical signals. However, a 12 bit A/D converter may be used in the detection of low power acoustic signals. The sample frequency of the A/D converter can be modified. Selected acoustic sensors 102 in an array may also be turned on or off. For example, when the 12 bit A/D converter is used, 50% more data is transmitted relative to the use of the 8 bit A/D converter. The higher amount of data may be compensated for by turning off half of the acoustic sensors in an array. The acoustic sensors may be turned off by turning off the amplifier 110 and/or the digital signal transmission module 118. Acoustic sensors may also be turned off for other reasons, such as limiting power consumption.

Figure 2:
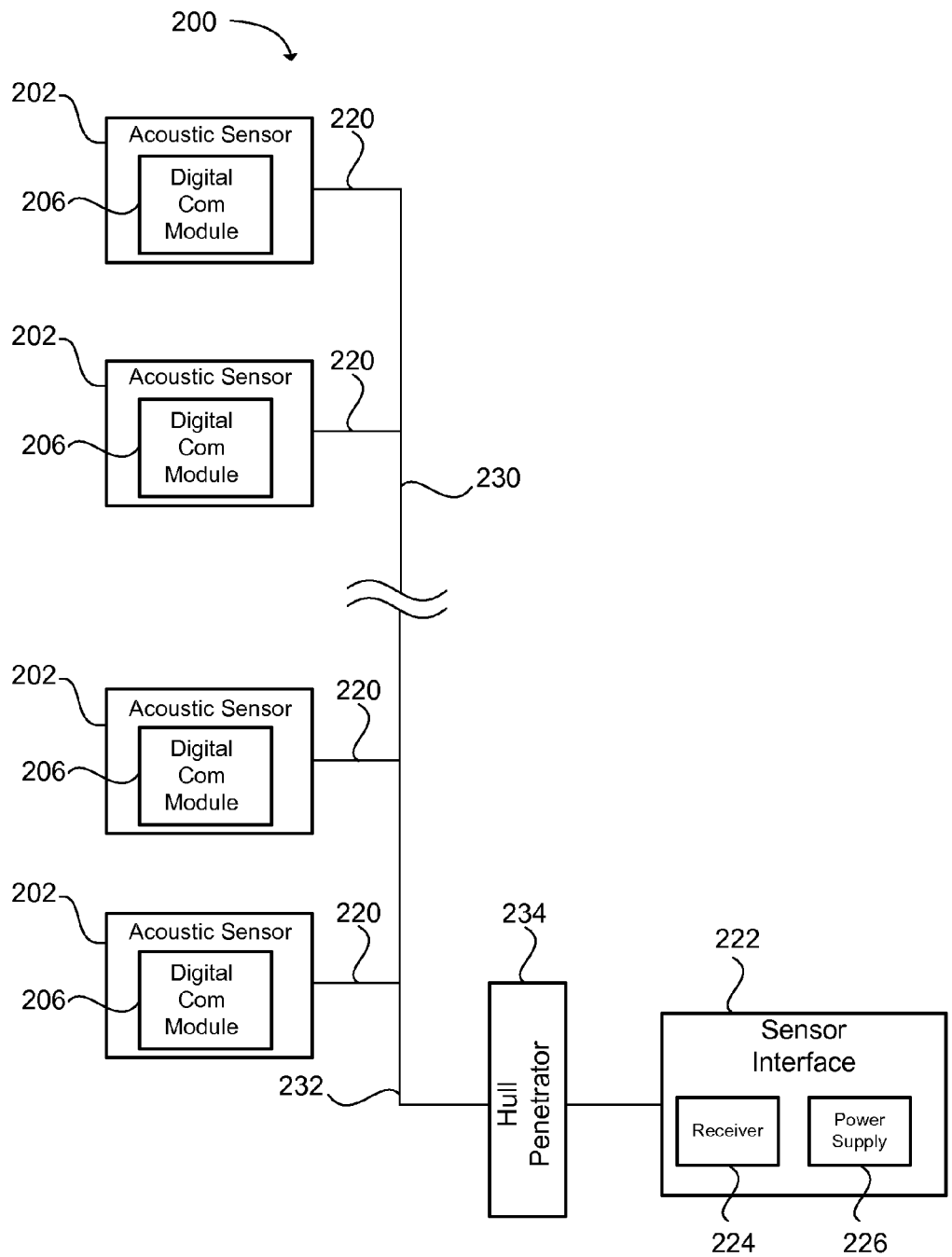
FIG. 2 illustrates an example of an acoustic sensor array comprised of acoustic sensors containing a digital communication module in accordance with an embodiment of the present invention.

FIG. 2 shows an example embodiment of an acoustic sensor array 200 comprising a plurality of acoustic sensors 202 connected to a cable 230. Each acoustic sensor can include a digital communication module 206 as previously discussed. Each digital communication module can communicate a digital modulated signal 220 from the digital communication module 206 enclosed in each acoustic sensor 202 to the sensor interface 222. The sensor interface can include a receiver 224 configured to receive each of the digital modulated signals. A power supply 226 can also be located at the sensor interface. The power supply can be used to provide a voltage source to power the digital communication module 206.

In one embodiment, a single cable or wire can be used to communicate the digital modulated signal 220, provide power to each acoustic sensor 202 and digital communication module 206, and send signals to the digital communication module 206. Alternatively, the cable 230 may be comprised of multiple wires, such as one wire providing power from the power supply 226, one wire carrying in-bound communication signals from each of the acoustic sensors to the receiver 224, and another wire connected to each acoustic sensor to provide outbound communication from the receiver to one or more selected digital communication modules 206. In another alternative, two wires may be used, one for bidirectional communication and one to provide power.

In order to reduce the number of wires or cables needed to carry the digital modulated signals 220 from the acoustic sensors 202, through the hull penetrator 234 and to the sensor interface 222, multiplexing of the digital modulated signals can be used. By multiplexing the digital modulated signals, a plurality of acoustic sensors can be connected to a single cable or wire used to transmit the digital modulated signals to the sensor interface. This can significantly reduce the number of wires or cables needed to provide communication between the acoustic sensors 202 and the sensor interface 222, thereby enabling the use of a smaller hull penetrator, and reducing the size and weight of the acoustic sensor array 200.

In one embodiment, instead of transmitting each digital modulated signal 220 as a separate signal, the digital signal 116 (FIG. 1) output by each A/D converter 114 can be modulated onto a subcarrier signal. A large number of closely-spaced orthogonal sub-carriers can be used to carry the digital signals. In one embodiment, each digital signal 116 can be carried on a single sub-carrier. Alternatively, the data from a digital signal can be divided into several parallel data streams or channels, with each channel modulated onto a sub-carrier. The digital data is modulated onto each sub-carrier with a conventional modulation scheme such as the quadrature amplitude modulation or shift keying discussed above. The data can be modulated at a relatively low symbol rate, maintaining total data rates similar to conventional single-carrier modulation schemes in the same bandwidth. The signal travelling along the cable 230 that is comprised of the multiple orthogonal channels is referred to as an orthogonal frequency-division multiplexed (OFDM) signal 232. Hundreds, or even thousands of sub-channels can be transmitted in a single OFDM signal. This allows the signals from potentially thousands of acoustic sensors to be transmitted along a single wire or cable 230 through the hull penetrator 234 to the sensor interface 222.

One significant advantage of using OFDM over a single carrier signal for each digital signal is the ability of OFDM to cope with severe channel conditions. For example, attenuation of high frequencies in a long copper wire, narrowband interference and frequency-selective fading due to multipath conditions can be accomplished without needing to use complex equalization filters. Channel equalization is simplified because OFDM may be viewed as using many slowly-modulated narrowband signals rather than one rapidly-modulated wideband signal. The low symbol rate makes the use of a guard interval between symbols affordable, making it possible to handle time-spreading and eliminate intersymbol interference. The use of OFDM also facilitates the design of an acoustic sensor array in which each sensor outputs a signal simultaneously at the same frequency. When this occurs, the signals from multiple acoustic sensors may be combined constructively, rather than interfering as would typically occur in a traditional single-carrier system.

The increased ability to cope with severe channel conditions afforded by the use of an OFDM modulation scheme enables a reduction in the number of wires or cables needed to carry the signals of the acoustic sensors 202 in the acoustic sensor array 200. In addition, the specifications for the type of wire or cabling used to carry the signals in the array can be relaxed. Typically, expensive impedance controlled wiring or cabling is used to minimize degradation of the signals sent by each acoustic sensor. However, when using OFDM, lower quality, non-impedance controlled wiring or cabling can be used. The ability to use non-impedance controlled wiring can provide significant cost savings in the construction of an acoustic sensor array, while maintaining the ability to receive the data from each acoustic sensor at the sensor interface 222.

In another embodiment, an acoustic sensor array 300 is comprised of a plurality of acoustic sensors 302 connected along a wire or cable 330. Each acoustic sensor 302 is connected to a digital communication module 306 by a module communication cable 304. The analog signal 308 from the acoustic sensor is transmitted to the digital communication module 306 via the module communication cable 304. The length of the module communication cable is minimized such that the length of the cable will increase the Signal to Noise Ratio (SNR) of the analog signal 308 by less than 1 dB relative to the module communication cable having zero length. In other words, the SNR of the analog signal will be decreased by less than 1 dB with the addition of the module communication cable. The SNR of the analog signal is decreased due to the capacitance of the cable. A typical underwater cable has a capacitance of around 30 pF per foot, as previously discussed. The SNR is reduced by the capacitance of the Acoustic Sensor 302 divided by the sum of the capacitance of the Acoustic Sensor 302 and the capacitance of the cable 304.

Figure 3:
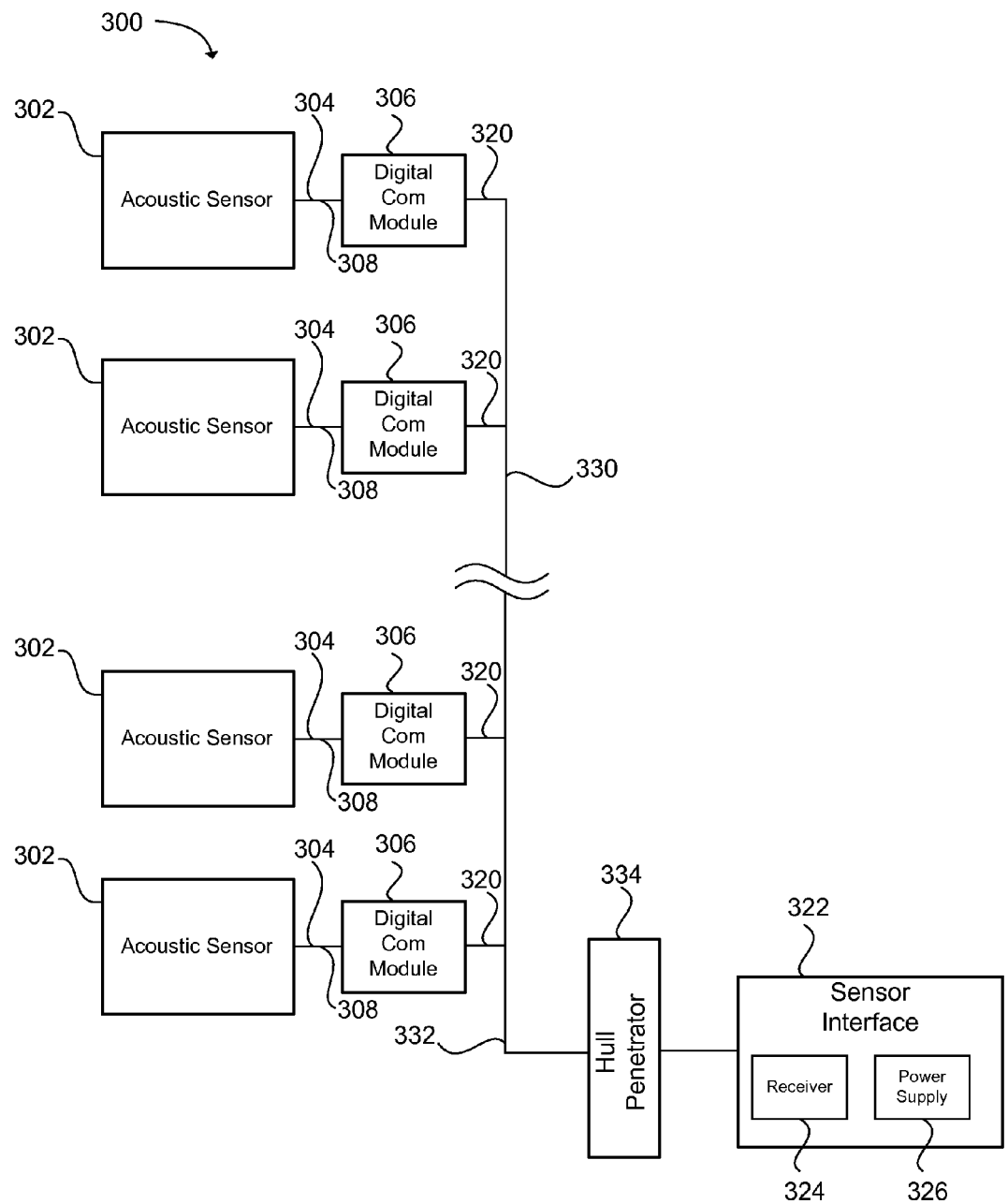
FIG. 3 illustrates an example of an acoustic sensor array comprised of acoustic sensors each connected to digital communication modules in accordance with an embodiment of the present invention.

The embodiment of the acoustic sensor array 300 illustrated in FIG. 3 enables a greater variety of acoustic sensors 302 to be used. The acoustic sensor array illustrated in FIG. 3 is not limited to acoustic sensors having an interior cavity. This enables acoustic sensors such as thin film sensors to be used. By minimizing the length of the module communication cable 304, the degradation of the analog signal 308 detected by the acoustic sensor is reduced. As in the embodiment illustrated in FIG. 2, the analog signal 308 is sent to the digital communication module 306, which amplifies the analog signal, converts it to a digital signal, and communicates the digital signal to the receiver 324 at the sensor interface 322. A power supply 326 can be used to provide a voltage source to power each digital communications module 306, as previously discussed. The cable 330 may optionally travel through a hull penetrator 334. Each digital signal is modulated to form a modulated digital signal 320. Each digital signal can be modulated onto a separate carrier signal for communication over the cable 330. Alternatively, each digital signal can be modulated on a sub-carrier to form an OFDM signal 332, as previously discussed.

Figure 4:
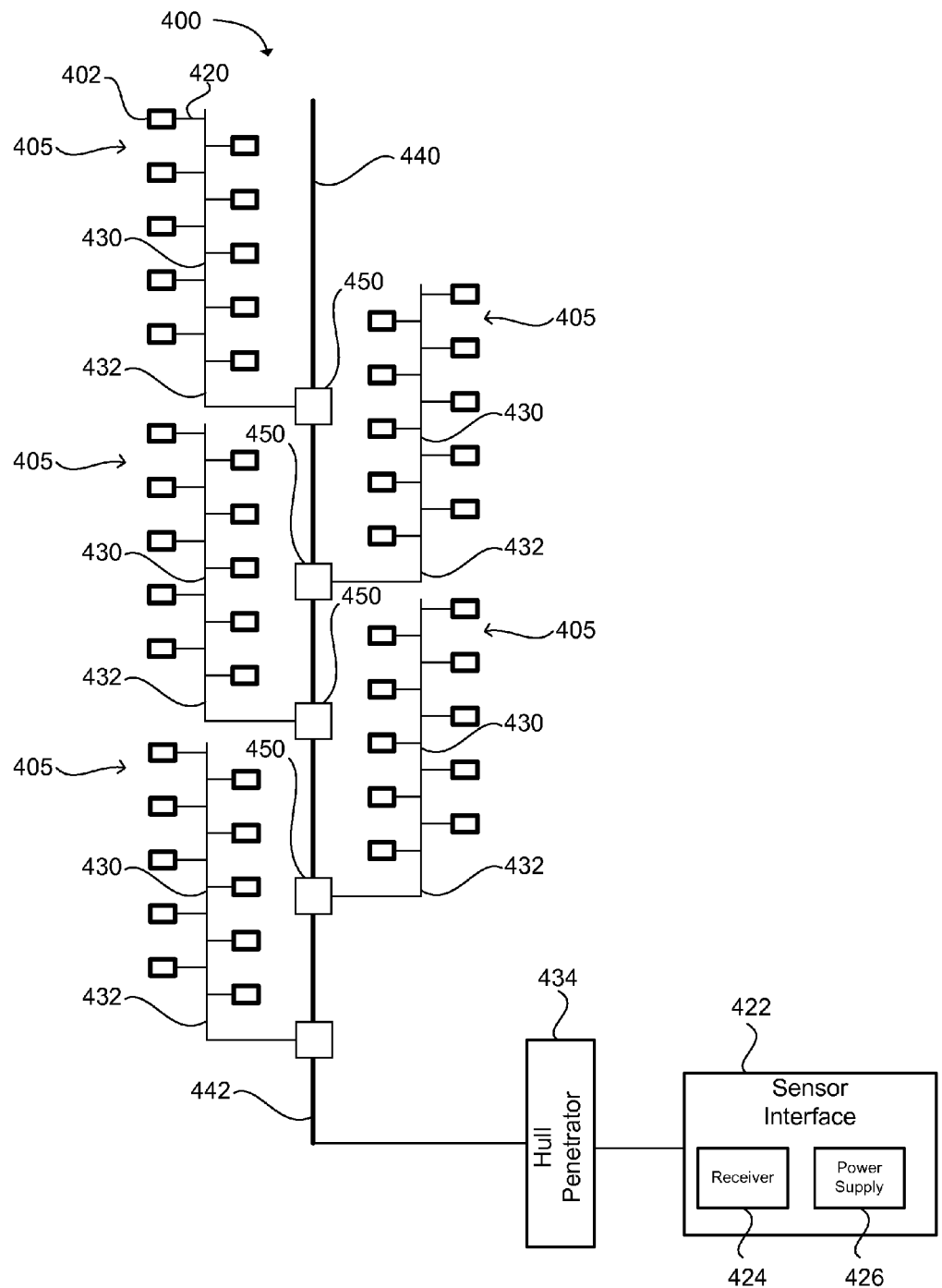
FIG. 4 illustrates an example of an acoustic sensor array comprised of sub-acoustic arrays connected to a trunk line in accordance with an embodiment of the present invention.

In another embodiment illustrated in FIG. 4, an acoustic sensor array 400 is comprised of a plurality of sub-arrays 405. Each sub-array is comprised of a plurality of acoustic sensors 402 connected to a cable 430. Each acoustic sensor includes a digital communication module (not shown) that operates as previously described. The digital communication module may be included within the acoustic sensor, as described with respect to the embodiment illustrated in FIG. 2. Alternatively, the digital communication module may be connected to the acoustic sensor through a module communication cable having a minimal length, as described with respect to the embodiment illustrated in FIG. 3. The digital modulation signals 420 output by the digital communication module connected to each acoustic sensor 402 may be carried on separate carrier signals, or combined to form an OFDM signal 432. Each cable 430 may be a non-impedance controlled cable. Each cable 430 in each sub-array 405 is connected to a trunk line 440. The trunk line can also be a non-impedance controlled cable. However, due to the amount of data carried on the trunk line, an impedance controlled cable may also be used.

In one embodiment, the trunk line is configured to communicate the OFDM signal of each sub-array 405 to the sensor interface 422. In one embodiment, each OFDM signal 432 can be carried on a separate carrier signal along the trunk line. Alternatively, the sub-carriers of each OFDM signal 432 can be combined to form an OFDM signal 442 that includes each of the sub-carriers from each OFDM signal 432 of the sub-arrays 405 connected to the trunk line 440.

The sensor interface 422 can include a receiver 424 operable to receive the OFDM signal(s). Each of the analog signals detected by each acoustic sensor 402 can be recovered and analyzed. A power supply 426 can provide a voltage source to power the digital communication modules in each sub-array. The use of a trunk line can reduce the number of cables sent to the sensor interface 422, thereby reducing the size of the hull penetrator 434.

In one embodiment, each of the sub-arrays can connect to the trunk line 440 through a data accumulator module 450. The data accumulator module is configured to receive the data transmitted along the sub-array 405 cables 430 and transmit the data along the trunk line. The data accumulator module can provide a data buffer useful in combining the OFDM signal 432 of each sub-array 405 onto the trunk line 440.

Locating the digital communication module in an interior cavity of the acoustic sensor, or connected via a relatively short cable, significantly reduces the amount noise introduced to the analog detection signal of the acoustic sensor. Digitizing the analog detection signal enables the signal to be transmitted using digital modulation techniques. This can enable the analog detection signal at each acoustic sensor in a large array to be communicated over a relatively long length of cable to a submarine, ship, or land based location where the digital signal can be analyzed. The digital signal for each acoustic sensor can be communicated with little or no information lost during transmission. In addition, digital modulation and multiplexing schemes can be used to reduce the number of cables in an acoustic sensor array and allow the use of lower quality, non-impedance controlled cables or wires for transmission of the digital signals. This enables lower cost, lighter weight arrays to be formed and connected to a ship or submarine through a smaller hull penetrator. Thus, the various embodiments of the present invention provide an acoustic sensor that enables an acoustic sensor array to be formed that is lower cost and lighter weight than traditional sensor arrays while providing enhanced transmission of the analog detection signal related to the acoustic signal.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A digital underwater acoustic sensor system, comprising:
an acoustic sensor configured to detect an underwater acoustic signal and form an analog signal proportional to the underwater acoustic signal, the acoustic sensor having a predetermined size and shape with an interior cavity;
a digital communication module positioned within the interior cavity comprising:
an amplifier configured to amplify the analog signal;
an analog to digital converter configured to convert the analog signal to a digital signal; and
a digital signal transmission module; and
a non-impedance controlled cable coupled to the digital communication module of the acoustic sensor and a plurality of additional acoustic sensors with each acoustic sensor containing the digital communication module, wherein the digital signal transmission module in each digital communication module is configured to modulate the digital signal onto one of a plurality of orthogonal subcarrier signals to form an orthogonal frequency-division multiplexed signal configured to travel along the non-impedance controlled cable to a receiver.

2. The system of claim 1, wherein the acoustic sensor is selected from the group consisting of a hydrophone, a hydrophone vector sensor, an accelerometer, and combinations thereof.

3. The system of claim 1, wherein the acoustic sensor is comprised of piezoelectric material configured to create the analog signal in response to the underwater acoustic signal.

4. The system of claim 1, wherein the digital signal transmission module is further configured to receive a signal to enable bi-directional communications along the non-impedance controlled cable.

5. The system of claim 1, wherein the non-impedance controlled cable provides in-bound communication signals from each of the acoustic sensors to the receiver and a second cable is connected to each acoustic sensor to provide outbound communication from the receiver to one or more selected digital communication modules.

6. The system of claim 1, further comprising a power supply coupled to the non-impedance controlled cable to provide a voltage source to power the digital communication module.

7. The system of claim 1, further comprising a power cable separate from the non-impedance controlled cable, the power cable configured to provide a voltage source to power the digital communication module coupled to the non-impedance controlled cable.

8. The system of claim 1, further comprising a trunk line coupled to a plurality of the non-impedance controlled cables, the trunk line configured to communicate the orthogonal frequency-division multiplexed signal of each non-impedance controlled cable to the receiver.

9. The system of claim 8, further comprising a data accumulator module connected to each node at a connection point of the non-impedance controlled cable and the trunk line, the data accumulator module configured to received data transmitted along the non-impedance controlled cable and transmit the data along the trunk line.

10. The system of claim 8, wherein at least one of the non-impedance controlled cable and the trunk line is configured to be coupled to the receiver through a hull penetrator in a vessel.

11. A digital underwater acoustic sensor system, comprising:
an acoustic sensor configured to detect an underwater acoustic signal and form an analog signal proportional to the underwater acoustic signal, the acoustic sensor having an interior cavity;
a digital communication module positioned within the interior cavity comprising:
an amplifier configured to amplify the analog signal;
an analog to digital converter configured to convert the analog signal to a digital signal; and
a digital signal transmission module configured to communicate the digital signal to a receiver,
wherein the digital communication module is contained completely within the interior cavity and the interior cavity is open on one side and filled with a potting material to form a water tight seal around the digital communication module.

12. The system of claim 11, wherein the acoustic sensor is selected from the group consisting of a hydrophone, a hydrophone vector sensor, an accelerometer, and combinations thereof.

13. The system of claim 11, wherein the acoustic sensor is comprised of piezoelectric material configured to create the analog signal in response to the underwater acoustic signal.

14. The system of claim 11, wherein the digital communication module is contained completely within the interior cavity of the acoustic sensor such that the acoustic sensor provides water resistance and pressure resistance for the digital communication module.

15. The system of claim 11, wherein the digital communication module is contained in an enclosure configured to provide at least one of water resistance and pressure resistance and the enclosure is contained within the interior cavity of the acoustic sensor.

16. The system of claim 11, further comprising a cable configured to be connected to a plurality of the acoustic sensors to enable the digital signal to be communicated from the digital signal transmission module of each acoustic sensor to the receiver.

17. A digital underwater acoustic sensor system, comprising:
  an acoustic sensor configured to detect an underwater acoustic signal and form an analog signal proportional to the underwater acoustic signal;
  a digital communication module coupled to the acoustic sensor comprising:
    an amplifier configured to amplify the analog signal;
    an analog to digital converter configured to convert the analog signal to a digital signal; and
    a digital signal transmission module configured to communicate the digital signal to a receiver on a vessel; and
  a module communication cable connecting the digital communication module to the acoustic sensor to communicate the analog signal to the analog to digital converter, wherein the module communication cable has a length that will decrease the Signal to Noise Ratio (SNR) of the analog signal by less than 1 dB; and
  a non-impedance controlled cable coupled to the digital communication module of the acoustic sensor and a plurality of additional acoustic sensors, with each acoustic sensor coupled to a separate digital communication module through a separate module communication cable, wherein the digital signal transmission module in each digital communication module is configured to modulate the digital signal of the acoustic sensor onto one of a plurality of orthogonal subcarrier signals to form an orthogonal frequency-division multiplexed signal configured to travel along the non-impedance controlled cable to a receiver.

18. The system of claim 17, wherein the acoustic sensor is comprised of piezoelectric material configured to create the analog signal in response to the underwater acoustic signal.

* * * * *